US008594882B2

(12) United States Patent
Wilke

(10) Patent No.: US 8,594,882 B2
(45) Date of Patent: Nov. 26, 2013

(54) DAMAGE DETECTION SYSTEM

(75) Inventor: Daniel D. Wilke, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 1426 days.

(21) Appl. No.: 12/015,217

(22) Filed: Jan. 16, 2008

(65) Prior Publication Data

US 2009/0182465 A1 Jul. 16, 2009

(51) Int. Cl.
*G06F 13/00* (2006.01)

(52) U.S. Cl.
USPC .......................................... 701/32.7; 701/29.1

(58) Field of Classification Search
USPC .............. 701/29, 33, 34, 14, 29.1, 32.3, 32.7; 702/33, 34, 35, 183, 185, 57, 58, 59; 340/870.11, 870.09, 870.16, 945, 963; 455/98, 99; 714/25; 244/4 R; 73/773
See application file for complete search history.

(56) References Cited

U.S. PATENT DOCUMENTS 3,363,184 A 1/1968 Smith
3,596,269 A * 7/1971 Laska ........................... 340/518
3,956,731 A * 5/1976 Lewis, Jr. ....................... 340/945
4,573,521 A 3/1986 Artz et al.
4,627,034 A 12/1986 Herndon
4,635,030 A * 1/1987 Rauch ........................... 340/945
4,816,828 A * 3/1989 Feher ............................ 340/945
4,972,176 A 11/1990 Vallance
5,195,046 A * 3/1993 Gerardi et al. .................. 702/35
5,426,362 A 6/1995 Ninnis
5,774,376 A * 6/1998 Manning ......................... 702/56
5,797,201 A 8/1998 Huang ............................ 36/132
5,816,530 A * 10/1998 Grube ........................... 244/1 R
6,006,163 A * 12/1999 Lichtenwalner et al. ....... 702/36

(Continued)

FOREIGN PATENT DOCUMENTS

EP 1411485 A2 4/2004
JP 2007329653 A 12/2007
WO 2005117519 A2 12/2005

OTHER PUBLICATIONS

Structural Damage Detection and Localization Using NetSHM Chintalapudi, et al, Computer Science and Civil Engineering Dept., Univ. Southern California.

(Continued)

*Primary Examiner* — Darnell Jayne
*Assistant Examiner* — Sasha T Varghese
(74) *Attorney, Agent, or Firm* — Klintworth & Rozenblat IP LLC

(57) ABSTRACT

A damage detection system for a vehicle, a machine, and/or another type of structure may comprise a processor, and a plurality of connected transmitters communicatively connected to the processor. The plurality of connected transmitters may be adapted to be attached directly to a vehicle, a machine, and/or another type of structure. Each of the plurality of connected transmitters may be independently configured to only send a coded damage signal to the processor when at least one neighboring transmitter is damaged, and not to send a damage signal to the processor if no neighboring transmitter is damaged. The processor may be programmed to identify a vehicle location of any transmitter which sends a damage signal indicating that at least one neighboring transmitter is damaged. The damage detection system may analyze the damaged area and report potentially affected sub-systems to users of a vehicle, machine, or other structure equipped with the damage detection system.

14 Claims, 4 Drawing Sheets

(56) References Cited

U.S. PATENT DOCUMENTS

| | | | | |
|---|---|---|---|---|
| 6,150,928 | A | 11/2000 | Murray | 340/426.14 |
| 6,263,737 | B1 | 7/2001 | Schoess | 73/583 |
| 6,370,964 | B1 * | 4/2002 | Chang et al. | 73/862.046 |
| 6,443,012 | B2 * | 9/2002 | Beardmore | 73/626 |
| 6,822,457 | B2 | 11/2004 | Borchert et al. | 324/512 |
| 6,915,861 | B2 | 7/2005 | Goodworth et al. | |
| 7,082,356 | B2 | 7/2006 | Mori | 701/29 |
| 7,103,507 | B2 * | 9/2006 | Gorinevsky et al. | 702/184 |
| 7,176,448 | B2 * | 2/2007 | Ogisu et al. | 250/227.14 |
| 7,189,959 | B1 * | 3/2007 | Morison et al. | 250/227.14 |
| 7,209,844 | B2 * | 4/2007 | Merrick et al. | 702/65 |
| 7,298,152 | B1 | 11/2007 | Wilke et al. | |
| 2003/0009300 | A1 * | 1/2003 | Giurgiutiu | 702/35 |
| 2003/0036830 | A1 * | 2/2003 | Jones | 701/29 |
| 2003/0048203 | A1 | 3/2003 | Clary et al. | 340/945 |
| 2003/0191564 | A1 * | 10/2003 | Haugse et al. | 701/29 |
| 2004/0012491 | A1 * | 1/2004 | Kulesz et al. | 340/506 |
| 2004/0117081 | A1 | 6/2004 | Mori | 701/29 |
| 2005/0075846 | A1 * | 4/2005 | Kim | 703/1 |
| 2005/0228597 | A1 * | 10/2005 | Giurgiutiu et al. | 702/35 |
| 2005/0278082 | A1 | 12/2005 | Weekes | |
| 2005/0284232 | A1 * | 12/2005 | Rice | 73/762 |
| 2006/0004499 | A1 * | 1/2006 | Trego et al. | 701/29 |
| 2006/0061369 | A1 | 3/2006 | Marks et al. | 324/542 |
| 2006/0073761 | A1 | 4/2006 | Weiss et al. | 446/456 |
| 2006/0081071 | A1 * | 4/2006 | Kessler et al. | 73/862.391 |
| 2006/0106550 | A1 * | 5/2006 | Morin et al. | 702/34 |
| 2006/0229785 | A1 * | 10/2006 | Baur et al. | 701/45 |
| 2006/0287842 | A1 * | 12/2006 | Kim | 702/183 |
| 2007/0061109 | A1 | 3/2007 | Wilke | |
| 2007/0118335 | A1 * | 5/2007 | Andarawis et al. | 702/188 |
| 2007/0144396 | A1 * | 6/2007 | Hamel et al. | 102/472 |
| 2007/0213943 | A1 * | 9/2007 | Curry et al. | 702/42 |
| 2007/0260425 | A1 * | 11/2007 | Kim | 702/182 |
| 2007/0265790 | A1 * | 11/2007 | Sealing et al. | 702/33 |
| 2007/0282541 | A1 * | 12/2007 | Griess et al. | 702/34 |
| 2008/0150555 | A1 * | 6/2008 | Wang et al. | 324/693 |
| 2008/0167833 | A1 * | 7/2008 | Matsen et al. | 702/122 |
| 2008/0223152 | A1 * | 9/2008 | Georgeson et al. | 73/862.041 |
| 2008/0255775 | A1 * | 10/2008 | Beard et al. | 702/35 |
| 2008/0255776 | A1 * | 10/2008 | Beard | 702/35 |
| 2008/0255778 | A1 * | 10/2008 | Liu et al. | 702/35 |
| 2008/0255781 | A1 * | 10/2008 | Beard et al. | 702/59 |
| 2009/0093999 | A1 * | 4/2009 | Kearns et al. | 702/184 |

OTHER PUBLICATIONS

Local Area Damage Detection in Composite Structures Using Piezoelectric Transducers Peter F. Lichtenwalner and Donald A. Sofge SPIE Symposium on Smart Structures and Materials, vol. 3326, 1998.

European Patent Office, Extended European Search Report for EP Application No. 08075887.3 mailed Mar. 7, 2012.

* cited by examiner

DAMAGE DETECTION SYSTEM

BACKGROUND

1. Field of the Disclosure

This disclosure is generally directed to damage detection and evaluation systems, and, more particularly to aircraft damage detection and evaluation systems that use a plurality of transmitters.

2. Background Description

Identification of damaged locations in a system or on a vehicle, machine, or other structure is commonly dependent upon operator perception and analysis. Often, an operator is unable to adequately perceive the entire damaged location due to dynamic system movement or limited field of vision. For example, a machine operator may not be able to see a portion of the machine because it may be blocked by other parts of the machine or workers. Additionally, poor lighting may contribute to inadequate perception of the operator.

Quite often, the operator must rely on sensors for secondary systems or subsystems to obtain information relating to possible system damage. For example, a machine may have a sensor that reports hydraulic pressure available. When the available hydraulic pressure drops below a normal operating pressure, the operator may know that there is a malfunction or damage in the hydraulic system. Of course, sensors for other subsystems may include, but are not limited to, electrical systems, pneumatic systems, navigation systems, etc.

Systems that are particularly susceptible to this type of problem include vehicles, machines, and other structures, and specifically include aircraft. Often a pilot of an aircraft is confined to a cockpit area that has a limited field of view. The pilot must rely almost exclusively on instrument readings that are reported to the cockpit. However, the pilot may also perceive vibrations through the aircraft. Should an aircraft be involved in a collision, with a bird for example, the pilot may not be able to ascertain the full extent of damage to the aircraft until after landing.

Aircraft are generally designed with certain safety features that may isolate aircraft systems in the case of an emergency. However, the pilots often Have no indication of potential system failure due to aircraft damage until system resources are depleted. For example, during combat, small arms tire may be a threat to the aircraft. If a bullet pierces the body of the aircraft and damages a hydraulic line thereby creating a small leak in the hydraulic system, the pilot may have no indication of the damage for several minutes or longer. During this time, the hydraulic system may be losing hydraulic fluid and the fluid may not be replaceable. Eventually, the hydraulic system may be depleted of fluid potentially causing even more serious problems. However, if the pilot were aware of the slow leak, the pilot may be able to isolate a portion of the hydraulic system that includes the leak, thus preserving the hydraulic fluid for the rest of the hydraulic system.

One well known incident involved a commercial aircraft crash at Sioux City Iowa. In this incident, an engine failure ruptured lines of all three hydraulic systems causing a total loss of hydraulic pressure to the aircraft. Had the pilots been aware of the damage to the hydraulic systems soon after the failure of the engine, they may have been able to isolate the damaged area before the total failure of the hydraulic system.

The present disclosure is directed to overcoming one or more of the problems or disadvantages associated with the prior art.

3. Discussion of Some of the Existing Art

Systems have been developed which sense positions of certain components. For example, a method of sensing position for a workpiece and a tool that performs a manufacturing operation on the workpiece is disclosed in U.S. patent application Ser. No. 11/096,612, assigned to The Boeing Company, the entirety of which is hereby incorporated by reference. This method includes measuring at least three discrete point positions associated with a first component by using a transmitter having a known position and orientation and in a line of sight with the three distinct point positions. The three distinct point positions have known distances relative to one another. The method computes a current position and orientation of the first component using data provided by the transmitter and the three distinct point positions, along with position and orientation data from a last known location of the first component. The method assumes no sudden position changes for the first component. While this method tracks and senses position of certain components, the method does not detect or analyze damaged locations. In U.S. Pat. No. 7,298,152 assigned to The Boeing Company, continually transmitting transmitters transmitting to one or more processors are attached to machines and/or vehicles in order to detect and/or determine a damaged portion of the machine and/or vehicle. However, the transmitters are continually transmitting to the one or more processors regardless of whether any damage has occurred and therefore may utilize un-needed transmission and/or un-needed processing.

SUMMARY

In one aspect of the disclosure, a damage detection system for at least one of a vehicle, a machine, and a structure comprises a processor, and a plurality of connected transmitters communicatively connected to the processor. The plurality of connected transmitters are adapted to be attached directly to the at least one vehicle, machine, and structure. The plurality of connected transmitters are each independently configured to only send a damage signal to the processor when at least one neighboring transmitter is damaged and not to send a damage signal to the processor if no neighboring transmitter is damaged. The processor is programmed to identify a location of any transmitter, on the at least one vehicle, machine, and structure, which sends a damage signal indicating that at least one neighboring transmitter is damaged.

In another aspect of the disclosure, a method of determining a damaged area of at least one of a vehicle, a machine, and a structure is provided. In one step, a processor is provided. In another step, a plurality of connected transmitters are attached to the at least one vehicle, machine, and structure. The plurality of connected transmitters do not transmit signals to the processor when none of the connected transmitters are damaged. In still another step, when at least one of the plurality of connected transmitters are damaged, at least one damage signal is sent to the processor through at least one neighboring transmitter of the at least one damaged transmitter. In an additional step, a damage area of the at least one vehicle, machine, and structure is identified based upon spatial coordinates of the at least one neighboring transmitter sending the at least one damage signal to the processor.

The features, functions, and advantages can be achieved independently in various embodiments of the present disclosure or may be combined in yet other embodiments.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Damage detection systems may be employed on vehicles such as an aircraft, or on other machines, and/or structures. However, damage detection systems, such as the systems disclosed herein, can easily be adapted for use on any type of vehicle, for example, a car, a truck, a tank, a submarine, an airship, a space vehicle, a ship, or virtually any other type of vehicle, in addition to on any type of machine, and/or on any type of structure. Such damage detection systems may be especially useful for combat aircraft.

Figure 1:
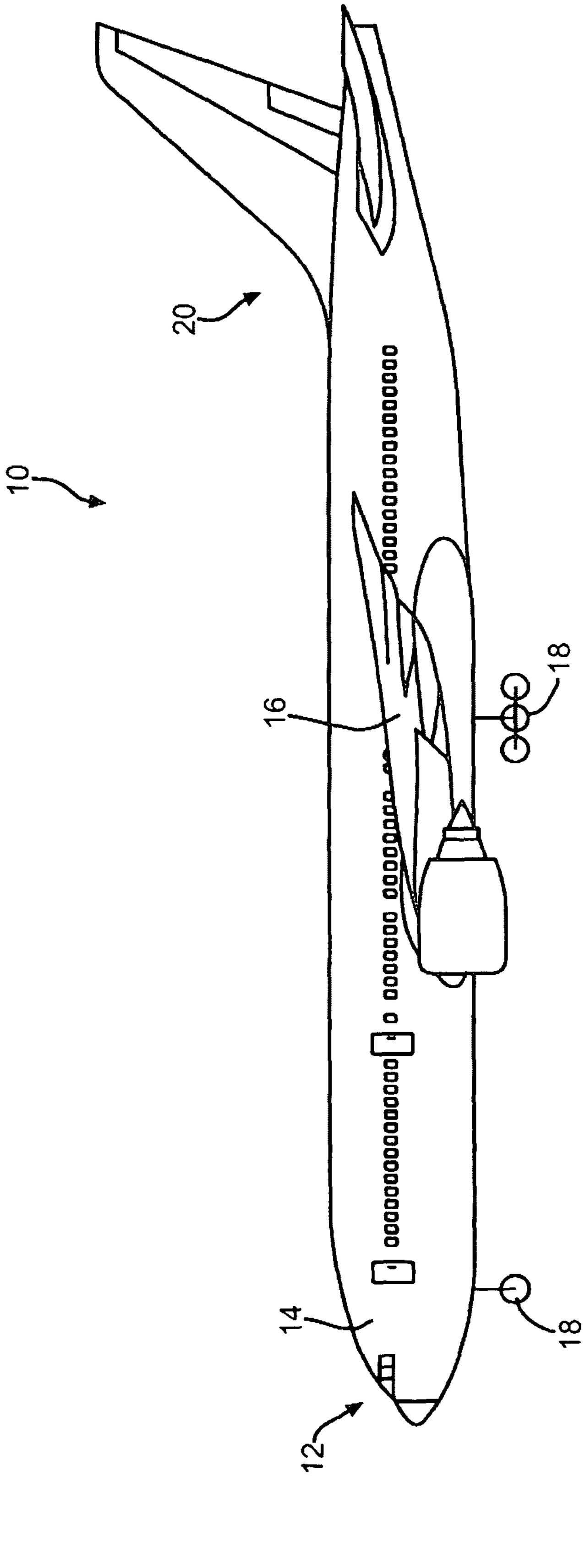
FIG. 1 is a side view of an exemplary aircraft.

As shown in FIG. 1, an aircraft 10 generally includes a cockpit or flight deck 12 from which one or more pilots controls the aircraft 10. Often, the pilot's view of the aircraft 10 is obscured by the body 14 of the aircraft 10. Accordingly, the pilot is unable to view large portions of the aircraft 10, for example, the underside of the wings 16, the landing gear 18, and/or the empennage 20. As a result, the pilots must rely on system instrumentation indications, such as hydraulic pressure, electrical volts and amperes, pneumatic pressures, etc., to alert the pilots to potential damage on the aircraft 10. The aircraft 10 in FIG. 1 is shown as an example of a vehicle that may use the damage detection system. Virtually any vehicle, machine, and/or structure could use such a system, for example, automobiles, ships, submarines, helicopters, trucks, earth moving equipment, spacecraft, bridges, towers, etc.

Figure 2:
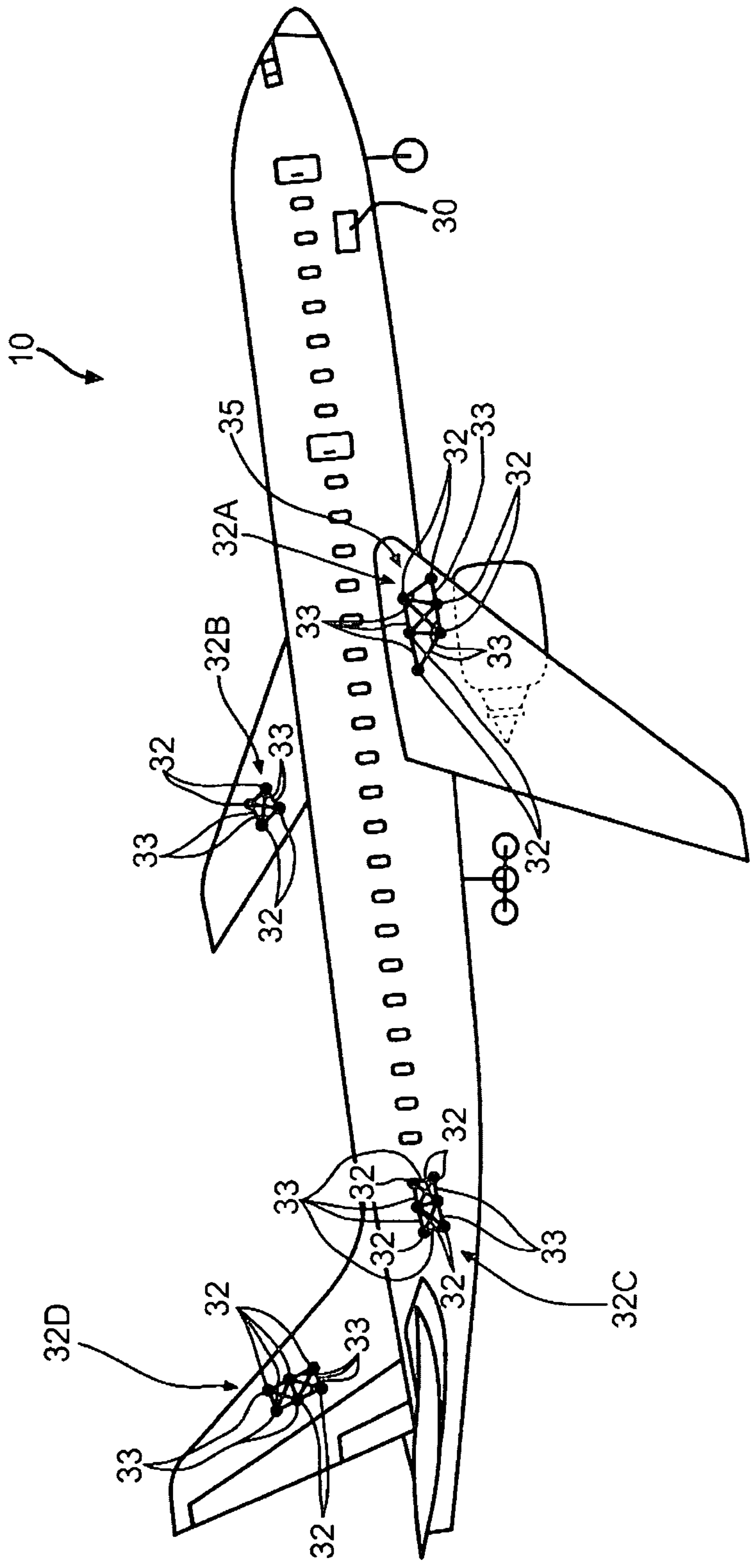
FIG. 2, is a top perspective view of the aircraft of FIG. 1 showing locations of a plurality of connected transmitters which comprise a damage detection system.

FIG. 2 shows the aircraft of FIG. 1 having a damage detection system. The damage detection system includes a processor 30 located in the aircraft 10 and a plurality of connected transmitters 32 arranged on the aircraft 10 at various locations 32A, 32B, 32C, and 32D. For simplicity, only a few connected transmitters 32 are shown at each of locations 32A, 32B, 32C, and 32D. However, any number of connected transmitters 32 may be disposed at locations 32A, 3213, 32C, and 32D. At each of the locations 32A, 32B, 32C, and 32D, connected transmitters 32 which neighbor each other may be connected to each other by conductive paths 33, such as conductive wiring, passing current between the connected transmitters 32. For purposes of this disclosure, transmitters 32 which neighbor each other may be defined as transmitters 32 which are adjacent to one another. The connected transmitters 32 may be remotely powered, thereby allowing each of the connected transmitters 32 to send a signal to the processor 30 when appropriate.

At each or the locations 32A, 32B, 32G, and 32D, the combination of the conductive paths 33 between neighboring connected transmitters 32 may form a conductive loop 35 looping continuously all of the conductive paths 33 of the connected transmitters 32 together. While FIG. 2 shows only certain locations 32A, 32B, 32C, and 32D having connected transmitters 32, the entire aircraft 10 could be substantially covered with such connected transmitters 32. Additionally, connected transmitters 32 may be located at certain critical locations within the body of the aircraft 10 itself to enhance early detection of damage to internal aircraft systems.

In a normal, non-damaged state, the connected transmitters 32 may be configured so that they do not transmit any signal to the processor 30 to save un-needed transmission and un-needed processing. If any of the connected transmitters 32 are damaged, such as by a weapon, the neighboring transmitters 32 which neighbor the damaged transmitters) 32 (i.e. the transmitters which are adjacent to the damaged transmitter(s)) may be configured to send a damage signal to the processor 30 to indicate damage has occurred to the damaged transmitter(s) 32. The damage signal may include a unique transmitter identifier. The non-neighboring transmitters 32 which do not neighbor the damaged transmitter 32(s) (i.e. the transmitters which are not adjacent to the damaged transmitter(s)) may be configured so that they do not send a damage signal to the processor 30, thereby saving un-needed transmission and un-needed processing.

In one embodiment, if any of the conductive paths 33 between previously connected neighboring transmitters 32 are broken and/or damaged, one or more of the now disconnected neighboring transmitters 32 may send a coded damage signal to the processor 30 to indicate that one or more neighboring transmitters 32 has been damaged, while non-neighboring transmitters 32, for which the conductive paths 33 are intact, may not send damage signals to the processor 30. The processor 30 may be programmed to decode and process the damage signals being transmitted from the neighboring transmitters 32 surrounding the damaged transmitter 32, and may be programmed to determine the spatial coordinates of each of the neighboring transmitters 32 sending the damage signals. The processor 30 may be further programmed to determine at least one of a size, a location, and a map of the damage area based upon the spatial coordinates of each of the neighboring transmitters 32 which are sending damage signals, and/or based upon the spatial coordinates of each non-neighboring transmitters 32 which are not sending damage signals.

The processor 30 may be programmed to alert the pilot and to identify at least one of a size, a location, and a map of the damage area. The processor 30 may also determine if the neighboring transmitters 32 sending the damage signals are simply malfunctioning, in which case, the processor 32 may simply remove the neighboring transmitters 32 from the system. As shown in FIG. 2, the damage detection system may allow the pilots to monitor the entire aircraft 10 without needing the ability to visually observe each part of the aircraft 10.

Figure 3:
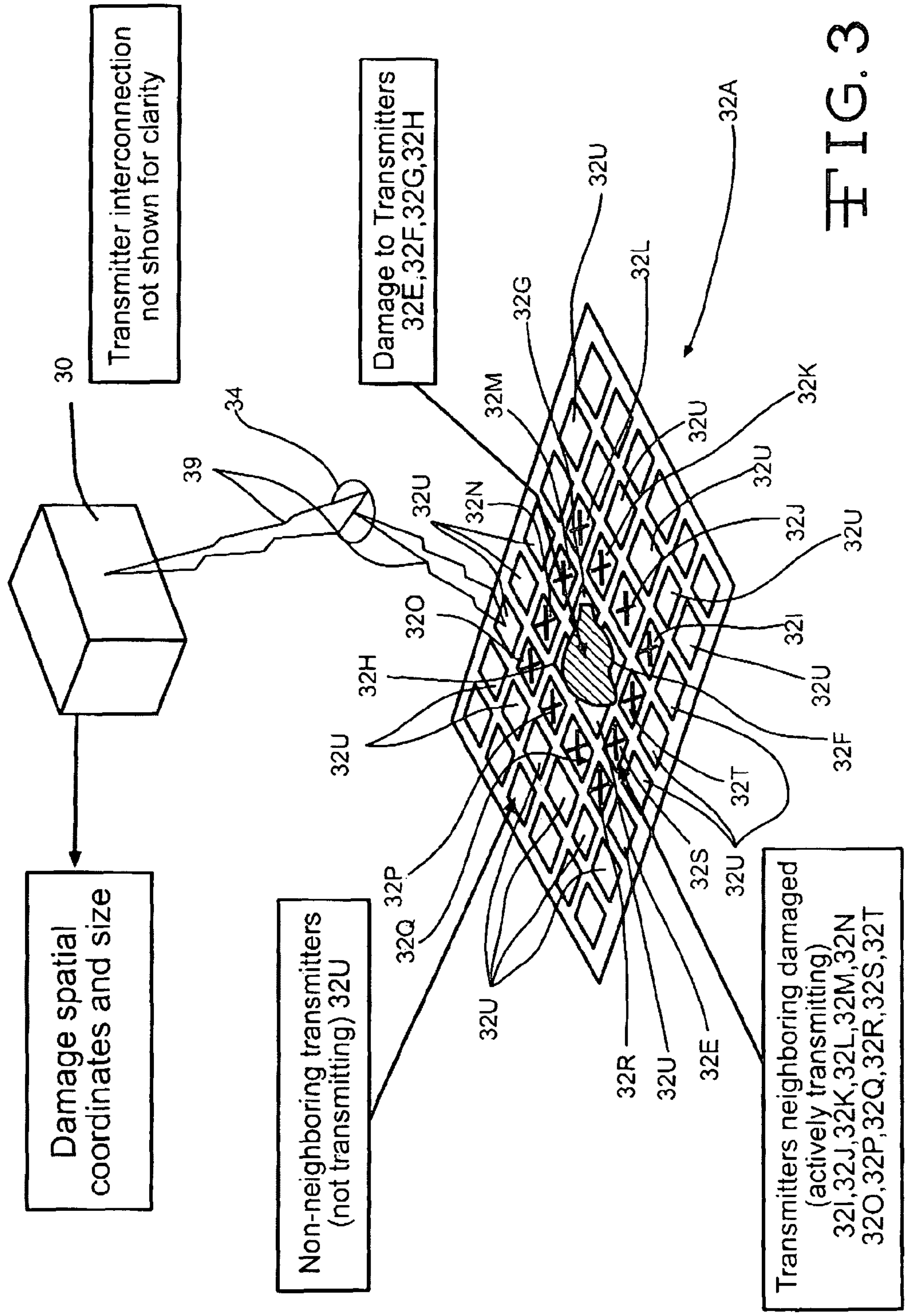
FIG. 3 is a representative schematic view of a portion of the damage detection system of FIG. 2 at a time when damage has occurred to some of the connected transmitters.

FIG. 3 shows a representative schematic view of a portion of the damage, detection system of FIG. 2 at a lime when damage has occurred to some of the connected transmitters 32 at location 32A. For illustration purposes, more connected transmitters 32 have been shown at location 32A in FIG. 3 than where shown in FIG. 2. Moreover, for simplicity, the connected transmitters 32 at locations 32B, 32C, and 32D of FIG. 2 have been excluded from FIG. 3. As shown, damage has occurred to transmitters 32E, 32F, 32G, and 32H. Because of the damage, the neighboring transmitters 32I, 32J, 32K, 32L, 32M, 32N, 32O, 32F, 32Q, 32R, 32S, and 32T which neighbor (i.e. which are adjacent) the damaged transmitters 32E, 32F, 32G, and 32H are transmitting damage signals 39 to the processor 30 through a node 34 which summarizes signal data from a group of transmitters 32 and forwards the information to the processor 30. The nodes 34 may act as intermediaries between the transmitters 32 and the processor 30. This arrangement of nodes 34 may speed up transmission of the signals and may minimize processing lime to analyze the signals. In other embodiments, the damage signals 39 may be directly transmitted to the processor without the use of a node 34. The neighboring transmitters 32I through 32T may transmit damage signals 39 to the processor 30 as a result of conductive paths 33 between the damaged transmitters 32E through 32H and the neighboring transmitters 32I through 32T having been damaged and/or severed.

All of the other transmitters 32U which do not neighbor the damaged transmitters 32E, 32F, 32G, and 32H may not transmit damage signals 39 to the processor 30 since they do not neighbor the damaged transmitters 32E, 32F, 32G, and 32H. The non-neighboring transmitters 32U may not transmit damage signals 39 to the processor 30 because the conductive paths 33 running to the non-neighboring transmitters 32U may not have been damaged and/or severed.

The neighboring transmitters 32I through 32T preferably communicate with the processor 30 wirelessly. However, the neighboring transmitters 32I through 32T could be wired to the processor 30 if desired. Additionally, if nodes 34 are employed, the transmitters 32I through 32T preferably communicate wirelessly with the node 34 which in turn communicates wirelessly with the processor 30. However, in certain locations, it may be advantageous for the transmitters 32I through 32T to be wired to the node 34.

The transmitters 32 may either generate power internally, or rely on an excitement signal for power. For example, the transmitters 32 may be piezo-electric in nature and generate power from vibrations of the aircraft 10. In one embodiment, the piezoelectric transmitters 32 may be chips that generate approximately 100 microcoulombs of electricity which may be stored temporarily in a capacitor. This amount of power is sufficient to generate and transmit the signal to the processor 30. Because an aircraft, machine, or structure, or any vehicle, may constantly generate vibrational energy, a virtually endless energy supply exists for the transmitters 32.

In another embodiment, the transmitters 32 may be radio frequency stimulated (e.g., RFID tags). The processor 30 may send out a radio frequency signal to radio frequency responsive chip transmitters 32 which convert the radio frequency energy into power and reflect back a signal to the processor 30. This arrangement is especially desirable for combat aircraft where the pilot may select a scanning time based on potential threats. For example, the pilot may only scan the aircraft 10 on egress after a mission to avoid potential detection by enemy anti-aircraft systems.

A wireless system is much lighter than a like wired system. Thus a wireless system is desirable over a wired system for an aircraft 10 because any reduction in empty weight of an aircraft 10 results in a corresponding increase in payload available. Furthermore, should one transmitter 32 fail, there is no doubt as to whether the transmitter 32 itself failed or the wiring between the transmitter and the processor has broken because there is no wire to break. Moreover, such wireless systems are very easily scaled and adaptable. For example, if an external fuel tank is added to an aircraft after an initial production, one or more transmitters 32 may simply be added to the external fuel tank and the programming of the processor 30 updated accordingly. Similar modifications could be made to the wireless system after repair or replacement of a component of after a rebuild of the wireless system.

Other means of powering the transmitters may exist, for example, solar power, wind power, battery powered, direct-powered, and/or other means. The means of powering the transmitters 32 is not limiting so long as the transmitters 32 are able to transmit the signal to the processor 30. Additionally, while one embodiment of the damage detection system may use power scavenging chips as transmitters, such as piezo-electric chips, and/or a radio frequency chip, the transmitters are not limited to a chip-like configuration and could vary widely in size and shape as long as the transmitters are able to send a signal to the processor. The transmitters 32 may obtain power from vibration, such as power scavenging chips converting structural vibrations into power. The processor 30 may be programmed to transmit a radio signal which may activate the transmitters 32. The radio signal may be transmitted by the processor 30 upon one of user initiation and/or on a regular interval.

Figure 4:
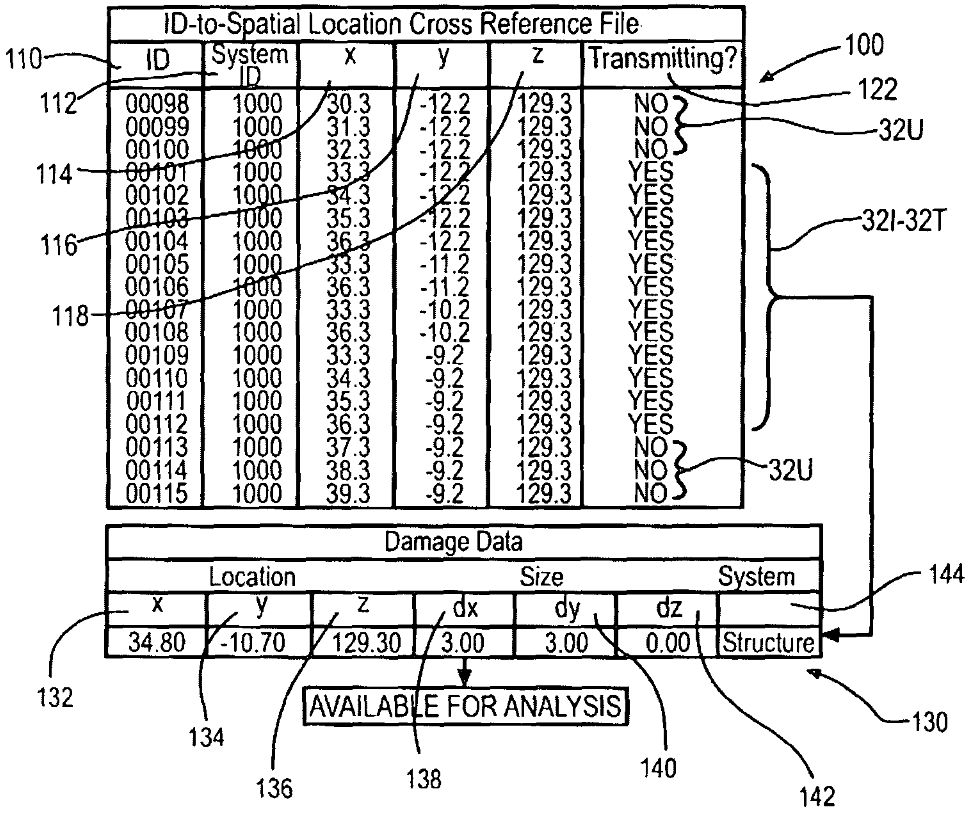
FIG. 4 is an example of tabulated data that may be compiled by the damage detection system of FIG. 3.

FIG. 4 shows an example of data that may be generated by the processor 30 in response to the damage signals 39 sent from the neighboring transmitters 32I through 32T. The data is only shown in table form for ease of reading and explanation. The processor 30 does not actually need to tabulate the data before analysis. The table 100 includes several columns of information. The first column 110 shows an identification number which may be assigned to each of the individual transmitters 32. The second column 112 shows a System ID, which corresponds to a particular aircraft system to which the transmitter 32 is assigned. For example, the System ID of "1000" shown in the figure may correspond to a structural member, such as a wing, tail, fuselage, etc. Other systems can be identified as well, for example, a System ID of "2000" may correspond to an engine, a System ID of "3000" may correspond to the hydraulic system, a System ID of "4000" may correspond to the electrical system, etc. Of course this labeling system allows for various sub-system identifiers as well. For example, a System ID of "2100" may correspond to the #1 engine, and a System ID of "2110" may correspond to the fuel control unit of the #1 engine. The System ID's may be kept very general or be made extremely specific based on user requirements, the complexity of the aircraft or vehicle and/or the number of transmitters employed in the system.

Columns 114-118 show the X, Y, and Z spatial coordinates assigned to each transmitter 32. These spatial coordinates may be assigned to the transmitter 32 at installation by exciting the system and recording the location or each transmitter 32 based on a reference location. The assignment can also be completed through direct input or other means. Thereafter, the processor 30 may be able to correlate a particular spatial coordinate to a particular location on the aircraft or vehicle. The Transmitting column 122 may show whether each particular transmitter 32 is sending the processor 30 a signal. For instance, each of transmitter identification numbers 101-112 which are shown as transmitting may correlate to the neighboring transmitters 32I through 32T which are transmitting damage signals 39. Each of the transmitter identification numbers 98-100 and 113-115 which are shown as not transmitting may correlate to the non-neighboring transmitters 32U and/or the damaged transmitters 32E-32H which are not transmitting damage signals 39. For simplicity, only a few of the non-neighboring transmitters 32 and/or damaged transmitters 32E-32H, identified as identification numbers 98-100 and 113-115, have been shown in the table but all of the remaining non-neighboring transmitters 32U and/or damaged transmitters 32E-32H may be shown in the table as non-transmitting.

The Damage Data table 130 shows a summary of damage data for the neighboring transmitters 32I through 32T which are transmitting damage signals 39. The Damage Data table 130 may be used to determine at least one of the size, location, and mapping of the damage area. Column 132 shows a center damage X coordinate of the neighboring transmitters 32I through 32T equal to 34.80 which may be calculated by adding the X coordinates of the two outer neighboring transmitters 32I and 32T and dividing by 2 ((33.3+36.3)/2=34.80). Column 134 shows a center damage Y coordinate of the neighboring transmitters 32I through 32T equal to −10.70 which may be calculated by adding the Y coordinates of the two outer neighboring transmitters 32I and 32T and dividing by 2 ((−12.2+−9.2)/2=−10.70). Column 136 shows a center damage Z coordinate of the neighboring transmitters 32I through 32T equal to 129.30 which may be calculated by adding the Z coordinates of the two outer neighboring transmitters 32I and 32T and dividing by 2 ((129.3+129.3)/2=129.3). Alternate methods for the determination of the coordinates of the damage center may also be employed.

Column 138 shows a total X damage coordinate distance between the neighboring transmitters 32I though 32T equal to 3.00 which may be calculated by determining the difference in the X coordinates of the two outer neighboring transmitters 32I and 32T relative to each other (36.3−33.3=3.0). Column 140 shows a total Y damage coordinate distance between the neighboring transmitters 32I though 32T equal to 3.00 which may be calculated by determining the difference in the Y coordinates of the two outer neighboring transmitters 32I and 32T relative to each other (12.2−9.3=3.0). Column 142 shows a total Z damage coordinate distance between the neighboring transmitters 32I through 32T equal to 0.0 which may be calculated by determining the difference in the Z coordinates of the two outer neighboring transmitters 32I and 32T relative to each other (129.3−129.3=0.0). Alternate methods for the determination of the damage size may also be employed. The system column 144 shows that the damage area pertaining to neighboring transmitters 32I though 32T are all assigned to a structure group meaning that the neighboring transmitters 32I through 32T were attached to a structure of the aircraft 10 as opposed to a sub-system. The information in column 144 corresponds to the System ID information of column 112 of table 100. The information from the Damage Data table 130 may be available to the processor 30 for further analysis.

The processor 30 may be programmed to analyze the data from the Damage Data table 130 for assessing structural integrity of the aircraft 10. After identifying the damage area, the processor may compare the damage area to structural information about the aircraft 10 and the processor 30 may determine whether the aircraft 10 remains airworthy based on the location and size of the damaged area. For example, should the size and location of the damage area indicate that a wing spar can no longer support its design load, the aircraft 10 should be subjected to only limited maneuvering until an appropriate repair is made. The processor 30 may further analyze the damage location to determine whether any sub-systems may be affected. For example, should the damage area be in the vicinity of a hydraulic line, the processor 30 may prompt the pilot to accomplish a particular checklist or to isolate the hydraulic system in the vicinity of the damage area if possible.

Should the damage detection system determine that a critical sub-system is located in the damage area, the processor 30 may immediately notify the pilot (or vehicle operator) through some sort of alert system, e.g., visual or aural alerts in the cockpit. The pilot may then take appropriate action based on the possible loss of the critical sub-system.

The processor 30 may be further programmed to infer potentially affected sub-systems or components based on two separate damage areas. For example, a projectile may enter a bottom portion of a wing and exit through a top portion of the wing. Should the damage detection system only have transmitters 32 disposed on the outer surfaces of the aircraft, the processor 30 may interpolate between the upper and lower damage locations to determine whether any sub-systems within the wing structure may have been damaged.

The damage detection system disclosed herein requires very little processing power due to the fact that only a limited amount of data is required for transmission since only neighboring transmitters 32I through 32T may be transmitting. Each of the neighboring transmitters 32I through 32T may essentially send an identity code that can be a single number, and the processor 30 may have previously stored the location and system data assigned to each particular neighboring transmitter 32I through 32T. Data storage requirements for such a system may be small. This limited amount of data may enable fast processing times and simple programming for cross-referencing of each neighboring transmitter 32I through 32T. As a result, damage detection systems described herein may be relatively inexpensive and light weight.

Additionally, the processor 30 may transmit the damage data to a ground station for further analysis. As a result, a maintenance technician may have access to the damage data and may recommend actions or procedures in addition to the actions and procedures recommended by the on-board damage detection system. Furthermore, the maintenance personnel may have additional time to prepare for potential repairs to the aircraft 10 before the aircraft 10 arrives at a maintenance station, thus saving valuable time and enabling a faster repair of the aircraft 10. This ability may prove critical in a war fighting situation.

Still further, based on the downloaded damage data, maintenance personnel may be able to determine an ideal repair facility to direct the aircraft 10 to should repair facilities with different capabilities be available. For example, if two repair facilities are available, but only one has a sheet metal shop, an aircraft with sheet metal damage should be directed to this particular repair facility if it is safe to do so.

Installations of such damage detection systems may be simple as well. As transmitter sizes get smaller in response to technological advances, several application techniques may be available such as using light-duty adhesive bonding, for example. Furthermore, the transmitters 32 may be individually attached to the aircraft with an adhesive, or for smaller transmitter sizes, using pre-printed "circuit sheets" over the selected surface. Moreover, the transmitters 32 may be integrated into the structures during fabrication of the structures. For example, the transmitters 32 may be mixed with or bonded into raw material prior to forming a particular structural element, such as a wing or a tail. For example, the transmitters 32 may be bonded between layers of a laminated structural element.

As a result, certain areas of the aircraft may be targeted for the transmitters 32. For example, only critical flight surfaces may be integrated in an effort to reduce cost, and weight. Furthermore, a malfunctioning transmitter 32, whether it be a neighboring transmitter 32I through 32T, a non-neighboring transmitter 32U, or a damaged transmitter 32E through 32H, may be "locked out" of the system. In other words, malfunctioning transmitters 32 may simply be ignored by the processing of the processor 30. Additionally, malfunctioning transmitters may be easily manually removed and/or replaced because the processor may need only be updated to recognize the identity of each new transmitter 32. The spatial coordinates of the old transmitter 32 may then simply be assigned to the new transmitter 32.

Once the damage detection system has identified the damage area, this information may be sent to other aircraft systems for further analysis. For example, the damage area information may be sent to the fuel management system which may account for extra drag associated with the damage area. As a result, the navigation system may update the maximum range of the aircraft 10 and inform the pilot if the original destination is unreachable with the added drag.

Other aspects and features of the present disclosure can be obtained from a study of the drawings, the disclosure, and the appended claims. It should be understood, of course, that the foregoing relates to exemplary embodiments of the disclosure and that modifications may be made without departing from the spirit and scope of the disclosure as set forth in the following claims.

The invention claimed is:

1. A damage detection system comprising:

a processor;

a plurality of radio frequency stimulated transmitters, a plurality of current conductive paths forming a conductive loop connecting all of the transmitters together, and at least one node, wherein each of said connected transmitters is configured to independently send a coded wireless damage signal through the at least one node to the processor when said connected transmitter determines that at least one of the current conductive paths to one of the neighboring transmitters is damaged, and to not communicate with the processor when said connected transmitter determines that the conductive paths to neighboring transmitters are undamaged; and the processor is programmed to decode each wireless damage signal and identify a damage area based upon spatial coordinates of each transmitter sending the damage signal.

2. The system of claim 1 further comprising at least one of a vehicle, a machine, an aircraft, or a structure, wherein the processor is further programmed to determine the damage area of the at least one vehicle, machine, aircraft, or structure.

3. The system of claim 2, wherein the processor is further programmed to identify potentially affected systems that lie within the damage area.

4. The system of claim 3, wherein the processor is further programmed to activate applicable checklists based on the potentially affected systems.

5. The system of claim 2, wherein the processor is further programmed to determine at least one of a size, a location, or a map of the damage area based upon the spatial coordinates of each transmitter sending the damage signal.

6. The system of claim 2, wherein the plurality of connected transmitters are attached to the at least one vehicle, machine, aircraft, or structure.

7. The system of claim 6, wherein the plurality of connected transmitters are integrated into a component of the at least one vehicle, machine, aircraft, or structure.

8. The system of claim 2, wherein the processor is further programmed to determine at least one of center X, Y, and Z coordinates of the damage area, or total X, Y, and Z coordinate distances of the damage area.

9. The system of claim 1 wherein the damage signal includes a unique transmitter identifier.

10. The system of claim 9, wherein the processor is further programmed to assign spatial coordinates to the unique transmitter identifier.

11. The system of claim 1, wherein each of the plurality of connected transmitters is independently configured to be, upon at least one of malfunction or damage, at least one of physically removed from the system or removed from programming of the processor.

12. The system of claim 1, wherein the plurality of connected transmitters are piezo-electric and are at least one of powered internally or powered due to an excitement signal.

13. A method of determining a damage area comprising:

providing a processor;

providing a plurality of radio frequency stimulated transmitters;

providing a plurality of current conductive paths forming a conductive loop connecting all of the transmitters together;

providing at least one node;

configuring each of the transmitters to send the processor a coded wireless damage signal through the at least one node when the transmitter independently determines that at least one conductive path passing current between the transmitter and one of the neighboring transmitters is damaged;

configuring each of the transmitters to not communicate with the processor when the transmitter determines that the conductive paths passing current to neighboring transmitters are undamaged;

decoding each wireless damage signal; and identifying a damage area based on spatial coordinates of each transmitter sending the damage signal.

14. The method of claim 13 further comprising the processor determining at least one of center X, Y, and Z coordinates of the damage area, or total X, Y, and Z coordinate distances of the damage area.

* * * * *